(12) United States Patent
Khan et al.

(10) Patent No.: US 11,745,171 B1
(45) Date of Patent: Sep. 5, 2023

(54) METAL-FREE PHOTOCATALYST AND A METHOD OF PREPARATION THEREOF

(71) Applicant: KING FAHD UNIVERSITY OF PETROLEUM AND MINERALS, Dhahran (SA)

(72) Inventors: Abuzar Khan, Dhahran (SA); Mohd Yusuf Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/825,397

(22) Filed: May 26, 2022

(51) Int. Cl.
| | |
|---|---|
| *B01J 31/06* | (2006.01) |
| *B01J 35/02* | (2006.01) |
| *B01J 35/10* | (2006.01) |
| *C25B 11/048* | (2021.01) |
| *C25B 11/049* | (2021.01) |
| *B01J 35/00* | (2006.01) |
| *C25B 1/04* | (2021.01) |
| *C25B 1/55* | (2021.01) |

(52) U.S. Cl.
CPC .......... *B01J 31/063* (2013.01); *B01J 35/004* (2013.01); *B01J 35/0033* (2013.01); *B01J 35/023* (2013.01); *B01J 35/026* (2013.01); *B01J 35/1014* (2013.01); *B01J 35/1019* (2013.01); *C25B 1/04* (2013.01); *C25B 1/55* (2021.01); *C25B 11/048* (2021.01); *C25B 11/049* (2021.01)

(58) Field of Classification Search
CPC .......... C25B 1/55; C25B 1/04; C25B 11/049; C25B 11/048; B01J 31/06–31/10; B01J 35/004
See application file for complete search history.

(56) References Cited

U.S. PATENT DOCUMENTS 5,516,875 A 5/1996 Simmons, III

FOREIGN PATENT DOCUMENTS

| CN | 107698761 A | 2/2018 |
|---|---|---|
| CN | 111519207 B | 6/2021 |
| CN | 113512195 A | 10/2021 |
| CN | 113649069 A | 11/2021 |

OTHER PUBLICATIONS

Chu et al ("Polyimide-based photocatalysts: rational design for energy and environmental applications", Journal of Materials Chemistry A, 2020, 9, pp. 14441-14462) (Year: 2020).*
Dai et al ("Conjugated polymers for visible-light-driven photocatalysis", Energy & Environmental Science, 2020, 13, pp. 24-52) (Year: 2020).*
Wang et al ("X-ray analysis on crystal structures of crystalline polyimides", 2013, pp. 189-191) (Year: 2013).*

(Continued)

*Primary Examiner* — Alexander W Keeling
(74) *Attorney, Agent, or Firm* — Oblon, McClelland, Maier & Neustadt, L.L.P.

(57) ABSTRACT

A method of preparing a photocatalyst. The method includes a sulfone-containing conjugated polyimide obtained by solvothermally imidizing 3-sulfonyldianiline 1,4,5, 8-naphthalenetetracarboxylic dianhydride with poly (amic acid) (PAA). The photocatalyst of the present disclosure can be used in an electrochemical cell for water oxidation processes.

15 Claims, 9 Drawing Sheets

(56) References Cited

OTHER PUBLICATIONS

Zhou et al ("Ultrathin conjugated polymer nanosheets as highly efficient photocatalyst for visible light driven oxygen activation", Applied Catalysis B: Environmental, 277, 2020, 119228 pp. 1-9) (Year: 2020).*

Zhang et al ("Effects of sulfonate incorporation and structural isomerism on physical and gas transport properties of soluble sulfonated polyimides", Polymer, 191, 2020, 122263, pp. 1-10) (Year: 2020).*

Yao et al ("Organic Semiconductor Based Devices for Solar Water Splitting", Advanced Energy Materials, vol. 8, Issue 32, 2018, 1802585, pp. 1-18 ) (Year: 2018).*

Lanzarini et al ("Polymer-Based Photocatalytic Hydrogen Generation", The Journal of Physical Chemistry C, 2012, 116, 20, pp. 10944-10949). (Year: 2012).*

Hicyilmaz et al ("Applications of polyimide coatings: a review", 2020). (Year: 2020).*

Chu et al ("Polyimide-based photocatalysts: rational design for energy and environmental applications", Mater. Chem. A, 2020, 8,) (Year: 2020).*

Pandey, et al. ; Sulphonated imidized graphene oxide (SIGO) based polymer electrolyte membrane for improved water retention, stability and proton conductivity ; Journal of Power Sources 2 99 ; pp. 104-113 ; Sep. 5, 2015 ; 10 Pages.

Ali, et al. ; Novel sulfonated polyimide-nafion nanocomposite membranes: Fabrication, morphology and physiochemical investigations for fuel cell applications ; Journal of Molecular Structure 1231 ; Jan. 22, 2021 ; 12 pages.

Jung, et al. ; Synthesis and characterization of sulfonated copolyimides via thermal imidization for polymer electrolyte membrane application ; Solid State Ionics 216 ; pp. 95-99 ; Apr. 6, 2012 ; 5 Pages.

* cited by examiner

METAL-FREE PHOTOCATALYST AND A METHOD OF PREPARATION THEREOF

STATEMENT OF PRIOR DISCLOSURE BY THE INVENTOR

Aspects of the present disclosure are described in M. Y. Khan; "Sulfone-containing conjugated polyimide 2D nanosheets for efficient water oxidation"; May 31, 2021; Chemistry—An Asian Journal, incorporated herein by reference in its entirety.

BACKGROUND

Technical Field The present disclosure generally relates to photocatalysts, particularly a metal-free photocatalyst. The present disclosure also relates to a method for synthesizing the photocatalyst.

Description Of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The dependency on fossil fuels to meet energy demands has environmental and ecological consequences. The carbon footprint associated with the burning of fossil fuels has detrimental effects on the environment and is currently a pressing issue. An alternative to fossil fuels is the use of renewable sources of energy. Solar energy and wind energy are widely available for use, but each has its disadvantages. Regarding the use of solar energy, one problem is the intermittent nature of solar energy. One practical and viable method of addressing the intermittent nature of solar energy is solar to chemical energy conversion. More specifically, photovoltaic cells can be coupled with artificial photosynthesis to harvest the solar photons and store them into chemical bonds. Water splitting in artificial photosynthesis can successfully harness solar photons into chemical fuels, thus offering a solution to solar energy's intermittency and storage problem.

Many semiconductor materials have been explored to improve the performance of photocatalysts. In recent years, organic-based polymeric semiconductors showing an overall water splitting capacity have been used due to their tailorable photophysical and electronic attributes. For example, graphitic nitride polymer was used as visible light photocatalysts; however, its efficiency as photocatalysts is severely limited owing mainly to low efficiency for visible-light absorption and fast recombination of charge carriers. Moreover, a limited number of building units (i.e., triazine and heptazine units) further prevent the engineering of its structural and electronic attributes. Also, polymers such as poly(phenylenevinylene), polythiophene, polyimide, and their derivates have been explored. Polymers' structure, morphology, and band structures can be tuned by employing various strategies, including co-polymerization, covalent or noncovalent modification, and hydrogen bond modulation to maximize the electron mobility and enhance their photocatalytic efficiency. However, a need still exists to design and synthesize cost-effective, robust organic conjugated photocatalysts with high efficiency and activity.

SUMMARY

In an aspect of the present disclosure, a metal-free photocatalyst is described. The photocatalyst includes a sulfone-containing conjugated polyimide obtained by solvothermally imidizing 3,3'-sulfonyldianiline 1,4,5,8-naphthalenetetracarboxylic dianhydride with poly (amic acid) (PAA).

In some embodiments, the sulfone-containing conjugated polyimide is in the form of nanosheets having an average length of 100-600 nanometers (nm) and an average thickness of 1-6 nm.

In some embodiments, the sulfone-containing conjugated polyimide is semicrystalline.

In some embodiments, the nanosheets are in the form of microparticles having an average diameter of 1-2 micrometers (μm).

In some embodiments, within each microparticle the nanosheets are stacked together.

In some embodiments, the nanosheets on an exterior surface of each microparticle are curled.

In some embodiments, the nanosheets of sulfone-containing conjugated polyimide has a Brunauer Emmett-Teller (BET) surface area of 100-140 square meter per gram ($m^2g^{-1}$).

In some embodiments, the photocatalyst is substantially free of metal.

In some embodiments, the photocatalyst has a band gap of 2.40-2.60 electron volts (eV).

In some embodiments, the photocatalyst has at least five X-ray diffraction peaks in a range of 10-30° 2θ.

In some embodiments, the photocatalyst has thermal stability up to 500° C. from thermogravimetric analysis.

In another aspect of the present disclosure, a photo-electrochemical cell is described. The photo-electrochemical cell comprises a photoanode including the photocatalyst, a counter electrode, and an aqueous electrolyte in contact with the photoanode and the counter electrode.

In some embodiments, the photoanode is formed by depositing an aqueous mixture of the photocatalyst, an organic solvent, and a fluoropolymer on a conductive substrate and drying.

In some embodiments, the photoanode does not have surface passivation or doping.

In yet another aspect of the present disclosure, a method of water oxidation is described.

The method includes irradiating the photo-electrochemical cell with solar illumination.

In some embodiments, the electrolyte is a 0.1-1 molar (M) $Na_2SO_4$ solution having a neutral pH; the photocatalyst has a current density of 15-25 milliampere per square centimeters ($\mu A\ cm^{-2}$) at 0 volts (V) vs. a saturated calomel electrode; and the electrolyte does not contain a sacrificial agent. As used herein, the term "sacrificial agents" refers to the electron donors or hole scavengers that reduce the recombination tendency of electrons and holes and accelerates the rate of hydrogen generation.

In some embodiments, the photocatalyst has a photostability retention under solar irradiation of 70-90% after 1000-1800 s.

In another aspect of the present disclosure, a method of synthesizing the photocatalyst is described. The method comprises reacting 3, 3'-sulfonyldianiline with 1,4,5,8-naphthalenetetracarboxylic dianhydride to form a poly (amic acid) precursor; and heating the poly(amic acid) precursor to form the photocatalyst.

In some embodiments, the poly(amic acid) precursor is heated at a temperature of 160-200° C. for 6-15 hours.

In some embodiments, the poly(amic acid) precursor undergoes an imidization reaction during the heating.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
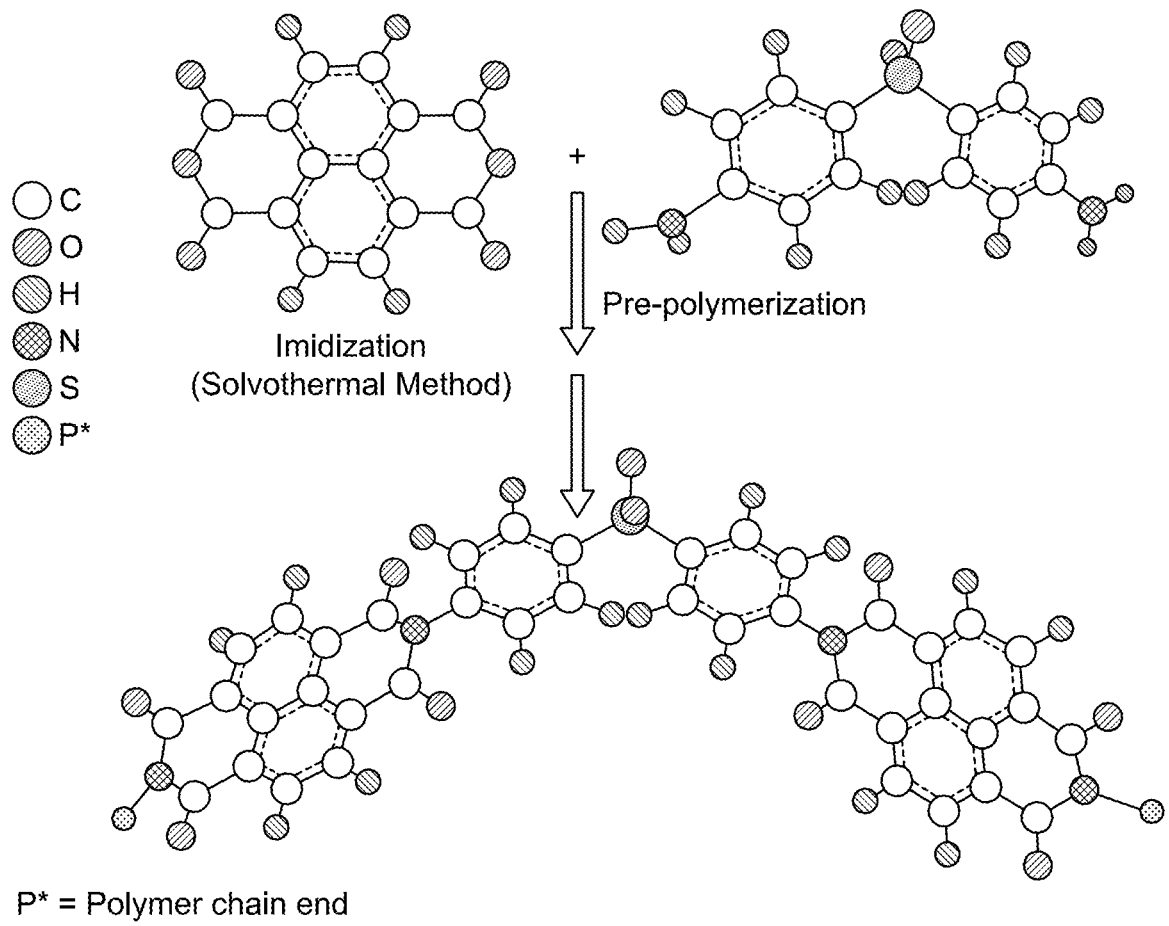
FIG. 1 shows a schematic chemical reaction between 3,3'-sulfonyldianiline and 1,4,5, 8-naphthalenetetracarboxylic dianhydride to obtain sulfonylated conjugated polyimide photocatalyst (sPI), according to certain embodiments of the present disclosure.

The present disclosure will be better understood with reference to the following definitions.

The headings (such as "Background" and "Summary") and sub-headings used herein are intended only for general organization of topics within the present invention, and are not intended to limit the disclosure of the present invention or any aspect thereof In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In the drawings, like reference numerals designate identical or corresponding parts throughout the several views. Further, as used herein, the words "a," "an" and the like generally carry a meaning of "one or more," unless stated otherwise. Also, the use of "or" means "and/or" unless stated otherwise. Similarly, "comprise," "comprises," "comprising" "include," "includes," and "including" are interchangeable and not intended to be limiting.

Furthermore, the terms "approximately," "approximate," "about," and similar terms generally refer to ranges that include the identified value within a margin of 20%, 10%, or preferably 5%, and any values there between. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z.

Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

The definitions of the terms as used herein are as follows. Unless specified otherwise, these terms are used alone or in combination with another term in the meaning as defined.

Throughout the specification and the appended claims, a given chemical formula or name to shall encompass all isomers (stereo and optical isomers and racemates) thereof where such isomers exist. Unless otherwise indicated, all chiral (enantiomeric and diastereomeric) and racemic forms are within the scope of the disclosure. Many geometric isomers of C=C double bonds, C=N double bonds, ring systems, and the like can also be present in the compounds, and all such stable isomers are contemplated in the present disclosure. Cis- and trans- (or E- and Z-) geometric isomers of the compounds of the present disclosure are described and may be isolated as a mixture of isomers or as separated isomeric forms.

All processes used to prepare compounds of the present disclosure and intermediates made therein are considered to be part of the present disclosure. Both the free form and salts of products are within the scope of the disclosure. If so desired, one form of a compound may be converted into another form. Further, a given chemical formula or name shall encompass all conformers, rotamers, or conformational isomers thereof where such isomers exist. Different conformations can have different energies, can usually interconvert, and are very rarely isolatable.

As used herein, the term "photocatalyst" refers to a material that absorbs light to bring it to a higher energy level and provides such energy to a reacting substance to make a chemical reaction occur.

As used herein, the term "photo-electrochemical cell" refers to a device consisting of a photoactive semiconductor as a working electrode, a counter electrode, and an appropriate supporting electrolyte.

As used herein, the term "photoanode" refers to the working electrode of the photo- electrochemical cell.

Aspects of the present disclosure are directed towards a metal-free photocatalyst with improved performance. The photocatalyst is a sulfonylated polyimide and is synthesized via a two-step method. The first step involves the synthesis of precursor poly (amic acid) (PAA), and the second step is a solvothermal synthesis of polyimide through thermal imidization. The synthesized photocatalyst was characterized by various analytical techniques. The photo-electrocatalytic (PEC) performance of the polyimide nanosheets was evaluated by studying water oxidation reaction without any sacrificial agent under 1-SUN. As used herein, the term "sacrificial agents" refers to electron donors or hole scavengers that reduce the recombination tendency of electrons and holes and accelerates the rate of hydrogen generation. The results showed an enhanced PEC performance and good stability towards water oxidation at 0 V vs. SCE with the photocatalyst of the present disclosure.

In one aspect, a photocatalyst is described. The photocatalyst is metal-free. The term metal-free refers to being devoid of transition metals, alkali metals, alkaline earth metals or noble metals. As used herein, the term "transition metal" is a metal selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Cn. As used herein, the term "alkali metal" is a metal selected from the group consisting of Li, Na, K, Rb, Cs, and Fr. As used herein, the term "alkaline earth metal" is a metal selected from the group consisting of Be, Mg, Ca, Sr, Ba, and Ra. As used herein, the term "noble metal" is a metal selected from the group consisting of Ru, Rh, Pd, Ag, Os, Ir, Pt, and Au. The photocatalyst is a sulfonylated conjugated polyimide photocatalyst (sPI). The sPI may be obtained by solvothermally imidizing 3,3'-sulfonyldianiline and 1,4,5,8-naphthalene tetracarboxylic dianhydride with poly (amic acid) (PAA). This is a solvothermal reaction where the reaction takes place in a solvent at a temperature higher than the boiling temperature of the solvent in a sealed vessel. The solvent may be a polar protic, a polar aprotic, or a non-polar solvent. Exemplary polar protic solvents that may be used include water, methanol, ethanol, isopropyl alcohol, acetic acid, etc. Exemplary polar aprotic solvents that may be used include dichloromethane, tetrahydrofuran, ethyl acetate, acetonitrile, dimethyl formamide, dimethyl sulfoxide, acetone, hexamethylphosphoric triamide, etc. Exemplary non-polar solvents that may be used include pentane, hexane, benzene, carbon tetrachloride, diethyl ether, xylene, toluene, acetic acid, chloroform, and ethyl acetate.

In a non-limiting alternative embodiment, the sulfonyl-containing conjugated polyimide, photocatalyst, is in the form of particles made of stacked or thin smooth surfaces assembled into nanosheets having an average length of 100-800 nm, preferably 100-760 nm, preferably 100-720 nm, preferably 100-680 nm, preferably 100-640 nm, preferably 100-600 nm, preferably 100-580 nm, preferably 100-550 nm, preferably 100-530 nm, preferably 100-500 nm and an average thickness of 1-20 nm, preferably 1-15 nm, preferably 1-10 nm, preferably 1-8 nm, preferably 1-6 nm. The sulfonyl-containing conjugated polyimide thus obtained is semicrystalline.

In a non-limiting alternative embodiment, the nanosheets formed by microparticles having an average diameter of 1-20 μm preferably 1-15 μm preferably 1-10 μm preferably 1-5 μm, preferably 1-4 μm preferably 1-2 μm where within each microparticle, the nanosheets are stacked together in a co-planar fashion.

In a non-limiting alternative embodiment, the nanosheets on the exterior surface of each microparticle are curled.

In a non-limiting alternative embodiment, the nanosheets of sulfonyl-containing conjugated polyimide have a Brunauer Emmett-Teller (BET) surface area of 100-200 $m^2g^{-1}$, preferably 100-190 $m^2g^{-1}$, preferably 100-180 $m^2g^{-1}$, preferably 100-170 $m^2g^{-1}$, preferably 100-165 $m^2g^{-1}$, preferably 100-160 $m^2g^{-1}$, preferably 100-155 $m^2g^{-1}$, preferably 100-150 $m^2g^{-1}$, preferably 100-145 $m^2g^{-1}$, preferably 100-140 $m^2g^{-1}$. In a non-limiting alternative embodiment, the photocatalyst is substantially free of metal. In a non-limiting alternative embodiment, the photocatalyst has a bandgap of 2.20-3.22 eV, preferably 2.30-3.12 eV, preferably 2.30-3.00 eV, preferably 2.30-2.90 eV, preferably 2.30-2.80 eV, preferably 2.30-2.70 eV, preferably 2.40-2.60 eV. In a non-limiting alternative embodiment, the photocatalyst has at least five X-ray diffraction peaks in a range of 10-50° 2θ, preferably 10-48° 2θ, preferably 10-46° 2θ, preferably 10-44° 2θ, preferably 10-42° 2θ, preferably 10-40° 2θ, preferably 10-38° 2θ, preferably 10-36° 2θ, preferably 10-34° 2θ, preferably 10-32° 2θ, preferably 10-30° 2θ. In a non-limiting alternative embodiment, the photocatalyst has thermal stability up to 800° C., preferably 760° C., preferably 700° C., preferably 650° C., preferably 630° C., preferably 600° C., preferably 580° C., preferably 550° C., preferably 525° C., preferably 500° C. from the thermogravimetric analysis.

Referring to FIG. 1, a schematic flow diagram of a method of synthesizing the sPI is described. The method involves a pre-polymerization reaction. For this purpose, the method involves weighing and dissolving 3,3'-sulfonyldianiline (SDA), having a molar mass of 248.30 g/mol, as the diamine monomer into one or more polar aprotic solvents to obtain a dissolved diamine monomer. Exemplary polar aprotic solvents that may be used include dichloromethane, tetrahydrofuran, ethyl acetate, acetonitrile, dimethyl formamide, dimethyl sulfoxide, acetone, hexamethylphosphoric triamide, etc. Further, 1,4,5,8-naphthalene tetracarboxylic dianhydride (NTCDA), having a molar mass of 268.18 g/mol, is added as the dianhydride monomer to the dissolved diamine monomer and is stirred at 0-5° C., preferably 0-4° C., preferably 0-3° C., preferably 0-2° C., preferably 0-1° C. under $N_2$ atmosphere to ensure the complete dissolution of NCTDA. In one embodiment, the SDA to NTCDA weight ratio ranges from 1:2 to 2:1, preferably 1:1.6 to 1.6:1, or 1:1. In one embodiment, the concentration of the dissolved diamine monomer is 5 mg/mL to 1 g/mL, preferably 10 mg/mL to 900 mg/mL, preferably 10 mg/mL to 800 mg/mL, preferably 10 mg/mL to 700 mg/mL, preferably 10 mg/mL to 600 mg/mL, preferably 10 mg/mL to 500 mg/mL, preferably 10 mg/mL to 300 mg/mL, preferably 10 mg/mL to 100 mg/mL, preferably 20 mg/mL to 70 mg/mL, preferably 30 mg/mL to 50 mg/mL. The reaction mixture is stirred at 0-5° C., preferably 0-4° C., preferably 0-3° C., preferably 0-2° C., preferably 0-1° C., where the temperature is raised 0.1-5° C./min, preferably 0.2-3° C./min, preferably 0.2-1° C./min until it reaches the temperature of 10-30° C., preferably 15-30° C., preferably 20-30° C. and is stirred 6 to 30 hours. To obtain a viscous PAA solution, the pre-polymerization reaction was then stopped.

The second step of the method includes imidizing the viscous PAA solution. In a non-limiting alternative embodiment, the PAA precursor is heated at 100-300° C., preferably 130-250° C., preferably 160-200° C. for 6-15 hours; more specifically, the viscous PAA solution obtained is transferred into a sealed container for imidization reaction at 100 to 250° C., preferably 130 to 230° C., preferably 130 to 200° C., preferably 150 to 200° C., preferably 170 to 190° C. for 6 to 20 hours. After that, the sealed container is cooled to 15 to 30° C., preferably 20 to 30° C. and the precipitate is filtered. The precipitate comprising sulfonyl-containing polyimide powder was then washed with polar protic solvents and polar aprotic solvents. Exemplary polar protic solvents that may be used include water, methanol, ethanol, isopropyl alcohol, acetic acid, etc. Exemplary polar aprotic solvents that may be used include dichloromethane, tetrahydrofuran, ethyl acetate, acetonitrile, dimethyl formamide, dimethyl sulfoxide, acetone, hexamethylphosphoric triamide, etc. The washed sulfonyl-containing polyimide powder was gathered after vacuum drying at 30 to 140° C., preferably 40 to 100° C., preferably 50 to 90° C., preferably 60 to 80° C. for 3 to 24 hours. The present subject matter also describes a photo-electrochemical cell. The photoelectrochemical cell includes a photoanode including the sulfonyl-containing conjugated polyimide photocatalyst synthesized by the method mentioned above. The photo-electrochemical cell also consists of a counter electrode and an aqueous electrolyte in contact with the photoanode and the counter electrode. Exemplary of the electrolyte that may be used include hydrogen halide, sulfuric acid, nitric acid, perchloric acid, chloric acid, an alkali metal salt, and an alkaline earth salt, wherein the electrolyte has a molarity of 1-10 in water.

In a non-limiting alternative embodiment, the photoanode is formed by depositing an aqueous mixture of the photocatalyst, an organic solvent, and a fluoropolymer on a conductive substrate and drying. Exemplary of the organic solvent that may be used include alcohols, aliphatic hydrocarbons, aromatic hydrocarbons, amines, esters, ethers, ketones, and nitrated or chlorinated hydrocarbons. Exemplary of the substrate that may be used include stainless steel, aluminum, nickel, copper, platinum, zinc, tungsten, and titanium.

More specifically, in one aspect of the present disclosure, the photoanode for the photo- electrochemical cell is formed by the drop-casting method on a fluorine-doped tin oxide (FTO) or an indium-doped tin oxide (ITO). As used herein, the term "drop-casting" refers to a preparation of the surface of chemically modified electrodes by formation of a thin solid film by dropping a solution onto a flat surface followed by evaporation of the solution in which the modifying layer is composed of particles such as nanotubes or nanoparticles and used for electro-catalysis for chemical sensing as well as materials evaluation. Before deposition, ink is prepared to contain the sulfonyl-containing conjugated polyimide photocatalyst in a water to ethanol mixture ratio ranging from 1:3 to 3:1, preferably 1:2 to 2:1, or 1:1 and 1-10% of Nafion® solution, preferably 2-9% of Nafion® solution, preferably 3-8% of Nafion® solution, preferably 4-7% of Nafion® solution, preferably 4-6% of Nafion® solution. The formed photoanode may comprise sulfonyl-containing conjugated polyimide photocatalyst in an amount from 1 wt. % to 10 wt. % of the photoanode, preferably from 1.5 wt. % to 7 wt. % of the photoanode, preferably from 2 wt. % to 6 wt. % of the photoanode, or 2.5 wt. % of the photoanode. After that, the ink solution was sonicated for 10 to 120 minutes to obtain a homogeneous suspension. The electrodes were prepared by depositing the sonicated suspension on the FTO glass with a catalyst loading of 1 to 10 mg cm$^{-2}$, preferably 1 to 8 mg cm$^{-2}$, preferably 1 to 6 mg cm$^{-2}$, preferably 1 to 4 mg cm$^{-2}$, preferably 1 to 2 mg cm$^{-2}$. The electrode is kept on a heating plate at 20 to 100° C., preferably 30 to 90° C., preferably 40 to 80° C., preferably 40 to 70° C., preferably 40 to 60° C., preferably 40 to 55° C., preferably 45 to 55° C. for 20 to 120 minutes. The fabricated electrode is employed as a photoanode and tested in a three-electrode cell having 0.5 M $Na_2SO_4$ electrolyte (pH 7.1) for its photocatalytic efficiency in a water oxidation reaction. The saturated calomel electrodes (SCE) are used as the reference electrode, while Platinum gauze (Pt) serves as the counter electrode. It is to be noted that the photoanode does not have surface passivation or doping.

In a non-limiting alternative embodiment, the electrolyte for the photo-electrochemical cell is a 0.1-1 M $Na_2SO_4$ solution having a neutral pH, where the electrolyte does not contain a sacrificial agent. As used herein, the term "sacrificial agents" refers to the electron donors or hole scavengers that reduce the recombination tendency of electrons and holes and accelerates the rate of hydrogen generation. In one embodiment, the photocatalyst has a current density of 10-50 µA cm$^{-2}$, preferably 10-35 µA cm$^{-2}$, preferably 10-30 µA cm$^{-2}$, preferably 15-30 µA cm$^{-2}$, preferably 15-25 µA cm$^{-2}$ at 0 V vs. a saturated calomel electrode.

The present subject matter also envisages a method of water oxidation. The method comprises irradiating the photo-electrochemical cell with solar illumination. In a non-limiting alternative embodiment, the electrolyte for the photo-electrochemical cell is a 0.1-1 M Na$_2$SO$_4$ solution having a neutral pH, wherein the electrolyte does not contain a sacrificial agent. As used herein, the term "sacrificial agents" refers to the electron donors or hole scavengers that reduce the recombination tendency of electrons and holes and accelerates the rate of hydrogen generation. In one embodiment, the photocatalyst has a current density of 10-50 µA cm$^{-2}$, preferably 10-35 µA cm$^{-2}$, preferably 10-30 µA cm$^{-2}$, preferably 15-30 µA cm$^{-2}$, preferably 15-25 µA cm$^{-2}$ at 0 V vs. a saturated calomel electrode. In a non-limiting alternative embodiment, the photocatalyst has photostability retention under solar irradiation of 50-90%, preferably 60-90%, preferably 70-90% after 800-2000 s, preferably 900-2000 s, preferably 1000-2000 s, preferably 1000-1900 s, preferably 1000-1800 s.

EXAMPLES

The following examples describe and demonstrate exemplary embodiments of the sulfone-containing conjugated polyimide photocatalyst. The examples are provided solely for the purpose of illustration and are not to be construed as limitations of the present disclosure, as many variations thereof are possible without departing from the spirit and scope of the present disclosure.

Example 1: Synthesis of sPI

For this purpose, 3,3'-sulfonyldianiline (1.24 g, 4.99 mmol) as the diamine monomer was weighed and dissolved entirely into 30 ml DMF followed by the addition of 1,4,5,8-naphthalenetetracarboxylic dianhydride (1.34 g, 5.00 mmol) as the dianhydride monomer and kept stirred at 0° C. under N$_2$ atmosphere to ensure the complete dissolution of 1,4,5,8-naphthalenetetracarboxylic dianhydride. The reaction mixture was stirred at 0 ° C. and kept raising the temperature naturally until it reached the ambient temperature and left stirring overnight. Later, the pre-polymerization reaction was stopped, and the viscous PAA solution was achieved.

The prepared PAA mixture was further transferred into a sealed container for further imidization reaction at 180° C. for 10 hours. The sealed container was cooled to room temperature, and the precipitate was filtered and washed with ethanol and dimethyl formamide. The obtained sulfonyl-containing polyimide powder with dark brown was gathered after vacuum drying at 70° C. overnight.

Example 2: Fabrication of Photoanode for the Photo-Electrochemical Cell

The photoanode for photoelectrochemical measurements was developed by the drop-casting method on FTO glass. Before deposition, ink was prepared to contain polyimide photocatalyst in a water-ethanol mixture (1:1) ratio and 5% Nafion® solution. Later, the ink solution was sonicated to obtain a homogeneous suspension. The electrodes were prepared by depositing a sonicated suspension on the fluorine-doped tin oxide (FTO) glass with a catalyst loading of 1 mg cm$^{-2}$. The developed electrode was kept on a heating plate at 50° C. for 60 minutes. The fabricated electrode was employed as a photoanode and tested in a three-electrode cell having 0.5 M Na$_2$SO$_4$ electrolyte (pH 7.1) for its photocatalytic efficiency in the water oxidation reaction. The saturated calomel electrodes (SCE) were used as the reference electrode, while Platinum gauze (Pt) served as the counter electrode. An Autolab potentiostat supported by NOVA software was utilized to record PEC performances of photoanodes under simulated dark and light conditions. A solar simulator equipped with AM-1.5G and UV cut of (λ>420 nm) filters (Oriel Sol-AAA Newport) provided the simulated light.

Characterization

The crystallinity of the polyimide nanosheets was analyzed by X-ray diffractometer (XRD) employing CuKá λ=0.15406 nm as a radiation source (Rigaku). The samples were scanned between 2θ=5° to 50° at a scan rate of 2° min$^{-1}$. The morphology of the sPI nanosheets was examined using FESEM and TEM. The micrograph was obtained on the FESEM using an LYRA 3 Dual Beam operated at an acceleration voltage of 20 kV (Tescan). The instrument is equipped with an energy dispersion spectrometer (EDX, Oxford Instruments) to determine the elemental ratio and confirm the constituent elements and mapping. The high-resolution images were obtained employing a transmission electron microscope (TEM) (JEOL JEM 2100F). Fourier transform infrared-attenuated total reflectance spectrophotometry (FTIR-ATR) spectra of the sPI nanosheets were recorded on Thermo Nicolet 6700 spectrometer. The thermal stability of the sPI nanosheets was analyzed for thermogravimetric analysis (TGA) using the Mettler Toledo instrument. The samples were heated from 30 C. to 700° C. at a heating rate of 10° C. min$^{-1}$. All the experiments were conducted under the argon atmosphere with 20 ml min$^{-1}$ flux. The N$_2$ adsorption—desorption measurements were performed on ASAP 2020 porosimeter (Micromeritics). The samples were heated to 150° C. with a heating rate of 10° C. min$^{-1}$ and then degassed at 150° C. for 200 min, followed by nitrogen adsorption at −196° C. The BET method (Brunauer Emmett—Teller) and the t-plot method were employed to calculate surface area. UV-Vis-NIR diffuse reflectance spectroscopy (DRS) was used to measure the absorbance and reflectance for bandgap calculation.

Results and Discussion

Figure 2A:
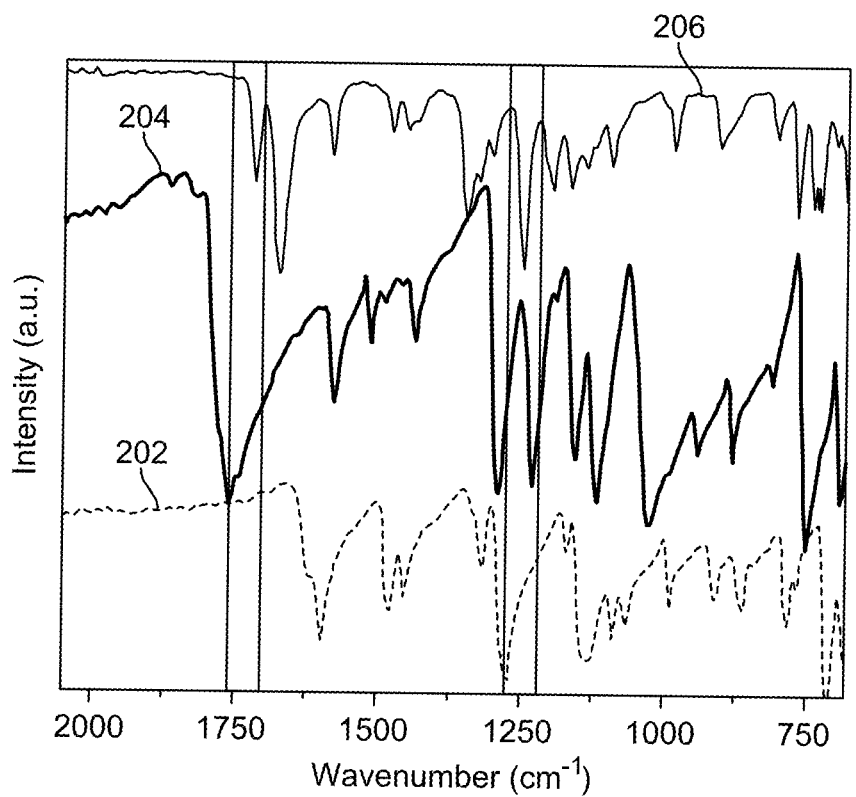
FIG. 2A shows Fourier Transform Infrared (FTIR) spectra of the sPI, according to certain embodiments of the present disclosure.

FTIR-ATR examination of the pure monomers, SDA (202), NTCDA (204), and the sPI (206) obtained after imidization was performed to understand the complete imidization reaction. The successful formation of imide linkage was verified by FTIR spectroscopy, as depicted in FIG. 2A. The strong absorption bands at 1700-1730 and 1650-1685 cm$^{-1}$ were attributed to the symmetric and asymmetric stretch vibrations of the typical C=O groups of the imide ring, confirming that imide rings are bonded with the naphthalene rings of the NTCDA monomer. Moreover, the vibrational bands around 1230-1260 cm$^{-1}$ are attributed to the stretching vibrations of sulfonyl groups present in the backbone of the sPI monomer. The shifting of the C=O peak from 1750-1780 cm$^{-1}$ of NTCDA to 1650-1680 cm$^{-1}$ in resultant sPI also demonstrates a conjugation of the PI.

Figure 2B:
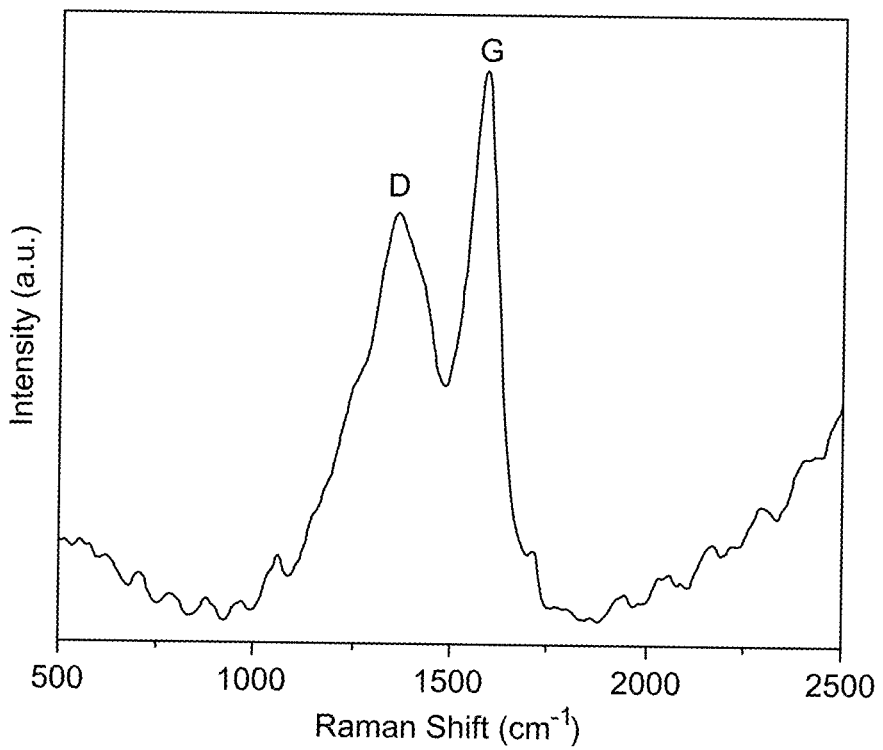
FIG. 2B shows a Raman spectrum of the sPI, according to certain embodiments of the present disclosure.

Raman spectra (FIG. 2B) indicated a conjugated system as the Raman peak arising at 1550-1595 cm$^{-1}$ is characteristic of the benzene ring, condensed benzene rings, and all aromatic rings. The C=C sp$^2$ stretch vibrations of conjugated carbon "chains" may provide a possible contribution to the G peak. The G$^+$band (1550-1595 cm$^{-1}$) was ascribed to the vibration of sp$^2$ carbon atoms indicating a well-ordered sp$^2$ planar structure. The presence of the G$^+$band and the absence of the G$^-$band also confirms the semiconducting nature of the polyimide nanosheets. The D band located near 1350-1380 cm$^{-1}$ is considered a disordered sp$^2$ vibrational peak. The ID/IG ratio was found to be 0.5 to 1, preferably 0.6 to 0.9, preferably 0.6 to 0.8.

Figure 2C:
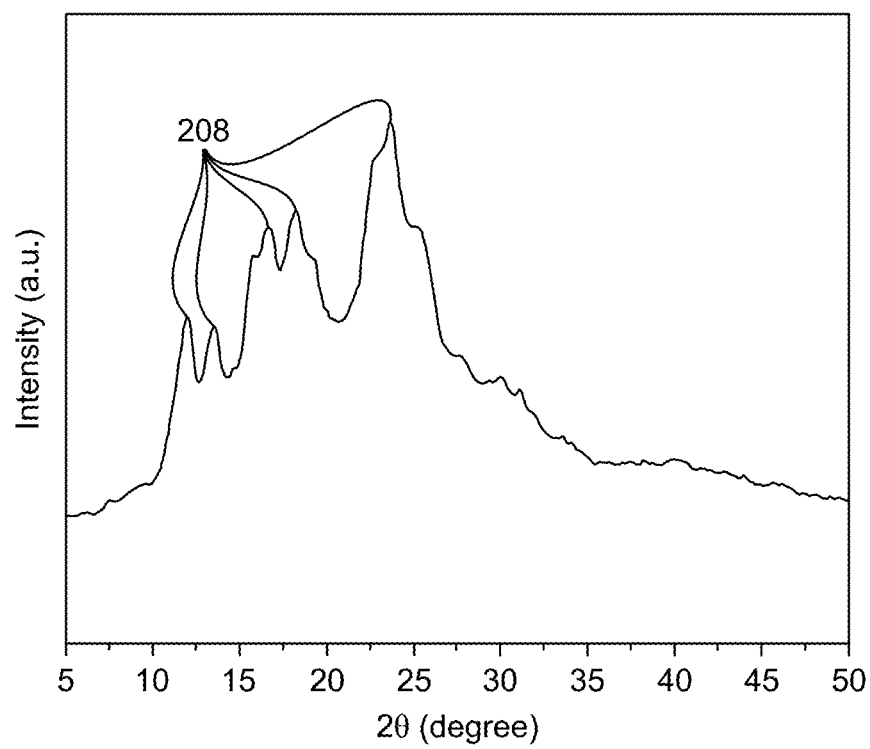
FIG. 2C shows an X-ray Diffraction (XRD) spectrum of the sPI, according to certain embodiments of the present disclosure.
Figure 2D:
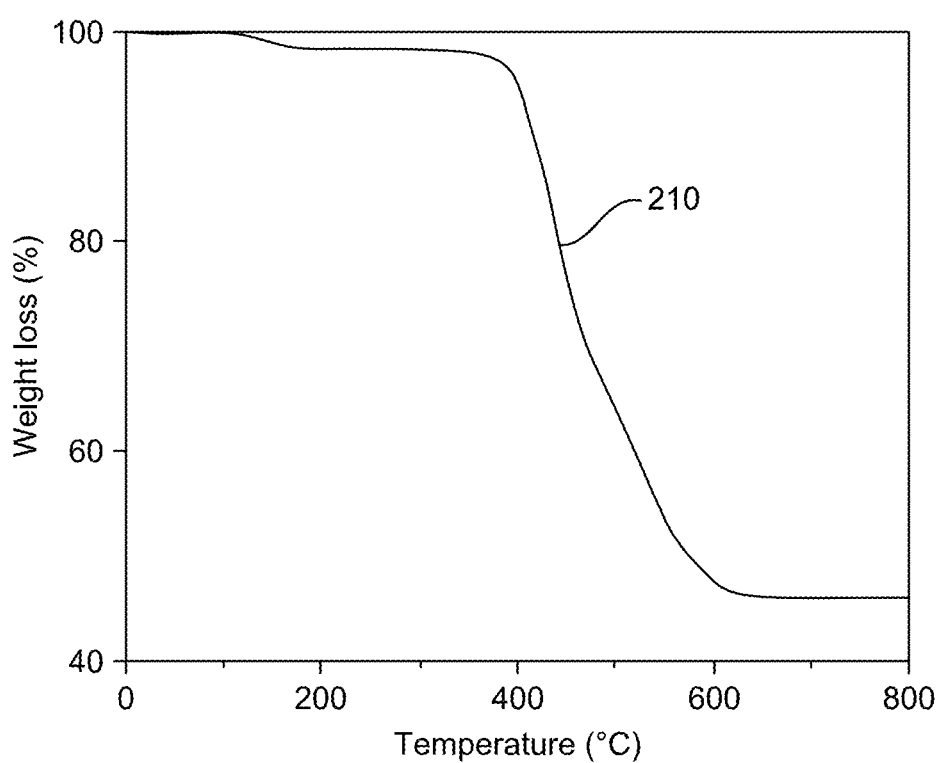
FIG. 2D shows a thermogravimetric analysis (TGA) curve of the sPI, according to certain embodiments of the present disclosure.

The XRD diffraction pattern, as depicted in FIG. 2C indicated the crystalline nature of the sPI. The spectral pattern of the polyimide was essentially marked by the presence of several prominent peaks in the 10-30° 2θ range (208). The peaks appeared to be relatively broad and diffused due to the semicrystalline nature. The diffraction peaks appeared at 2 theta values 2θ=11.05-12.10°, 12.20-14.20°, 14.40-16.20°, 16.22-17.20°, 17.30-19.20°, 21-24.30°, and 24.80-25.24°. The charge mobility is strongly linked to the degree of order within a semiconductor. A relatively higher crystallinity observed from the X-ray diffraction means a higher degree of order with a lower density defect within sPI that promotes interfacial transport of excitons which is also reflected in the superior photocatalytic performance of the sPI sheets. The sPI nanosheets were further characterized for their thermal stability in an inert atmosphere, and the curve is illustrated in FIG. 2D. The sPI displayed a stable curve until 440 to 500° C. (210), and major weight loss started after this temperature. This weight loss is associated with the decomposition of the polymer fractions with imide groups in the polyimide chain due to thermal degradation. However, an initial weight loss (0.1-8%) is observed near 130-230° C., preferably 130-200° C. which could be due to a small amount of residual solvent.

The morphological features of the prepared sPI nanosheets were investigated using SEM and TEM, as shown in FIG. 3, and the chemical composition was determined by energy dispersive spectroscopy (EDS). The micrographs of SEM displayed aggregates of microparticles arranged irregularly (302), as can be observed in FIG. 3A. A closer examination of the micrographs using TEM (FIG. 3B) revealed small particles with smooth surfaces assembled into 2-D sheets like structures with uneven morphology (304). These sheets were stacked together to form macro structures. It is apparent from the TEM micrograph that sPI particles consisted of aggregates of interconnected transparent sheets of monolayer thickness. The sheets were curled to lessen surface energy which also evidenced the ultrathin nature. The sheets were irregular in shape and stacked to give a layered structure. The length of sheets varied from 200-400 nm with a thickness of around 2-3 nm.

Figure 3A:
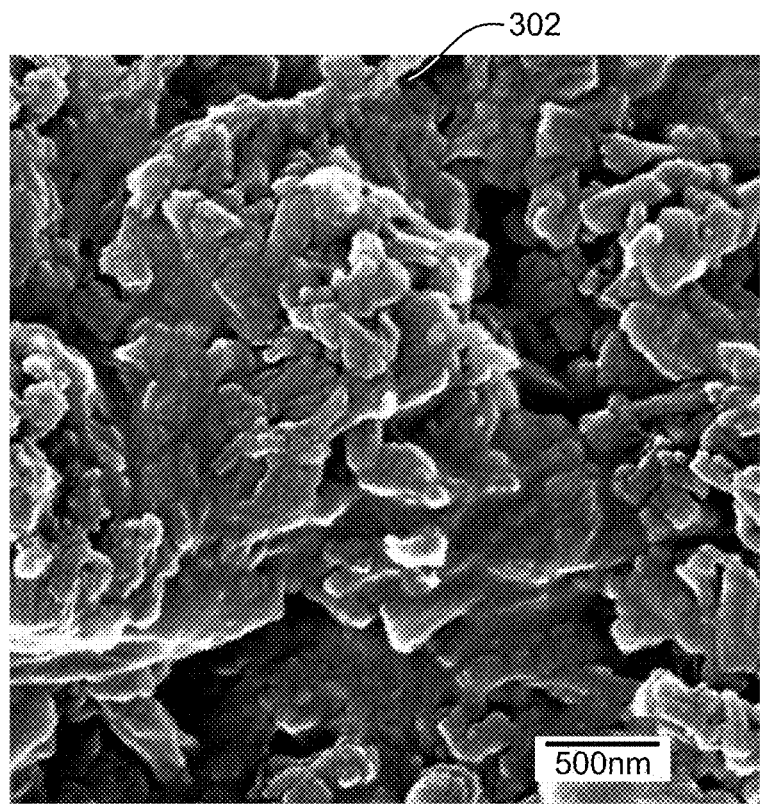
FIG. 3A shows a field emission scanning electron microscope (FESEM) micrograph of the sPI, according to certain embodiments of the present disclosure.
Figure 3B:
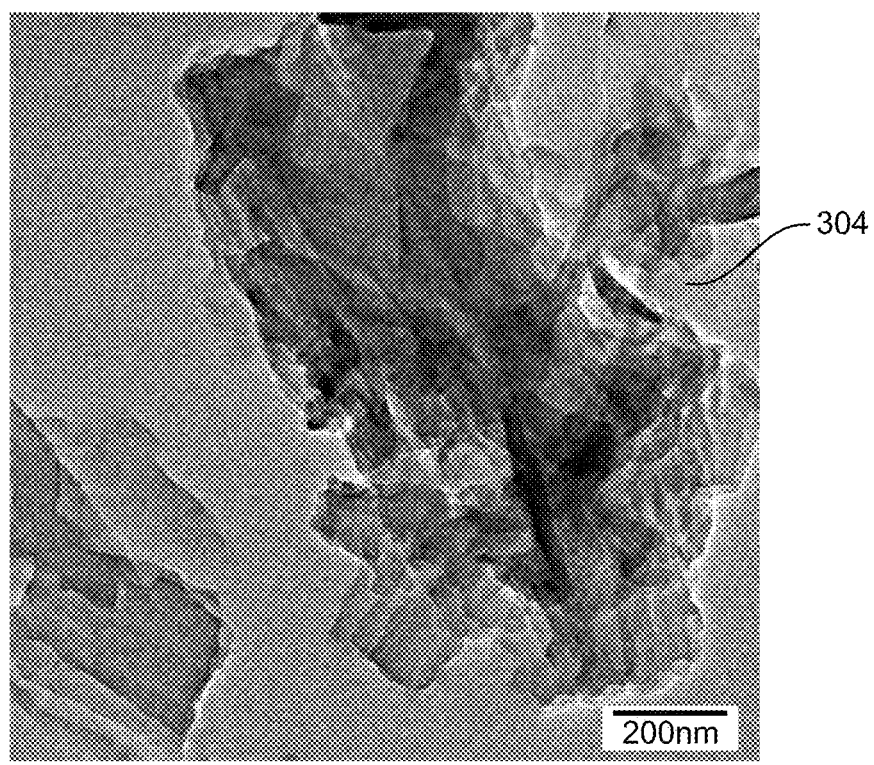
FIG. 3B shows a transmission electron microscope (TEM) image of the sPI, according to certain embodiments of the present disclosure.
Figure 3C:
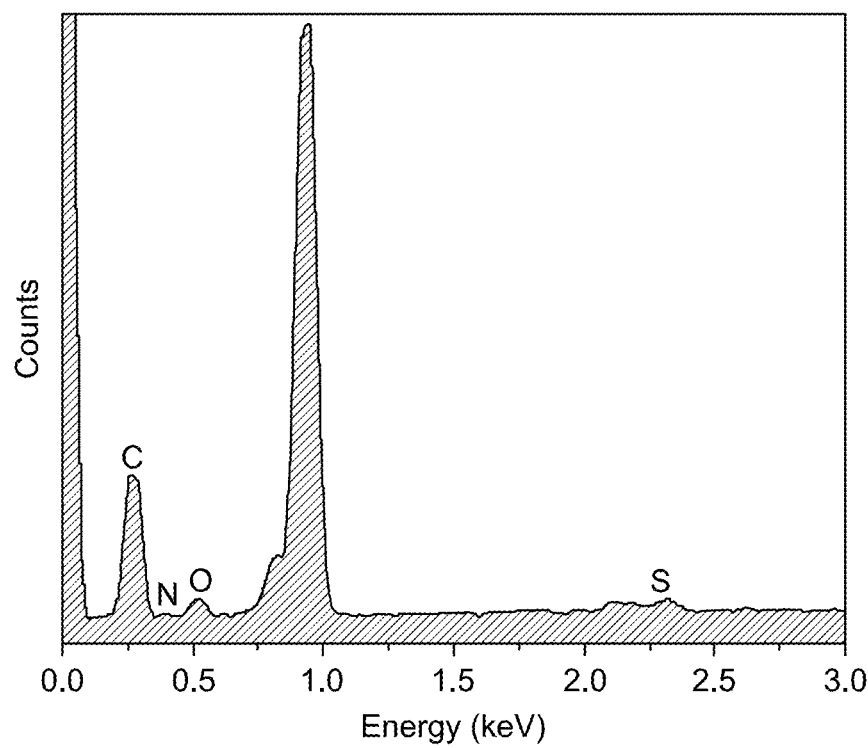
FIG. 3C shows an energy-dispersive X-ray spectroscopy (EDS) spectra of the sPI, according to certain embodiments of the present disclosure.
Figure 3D:
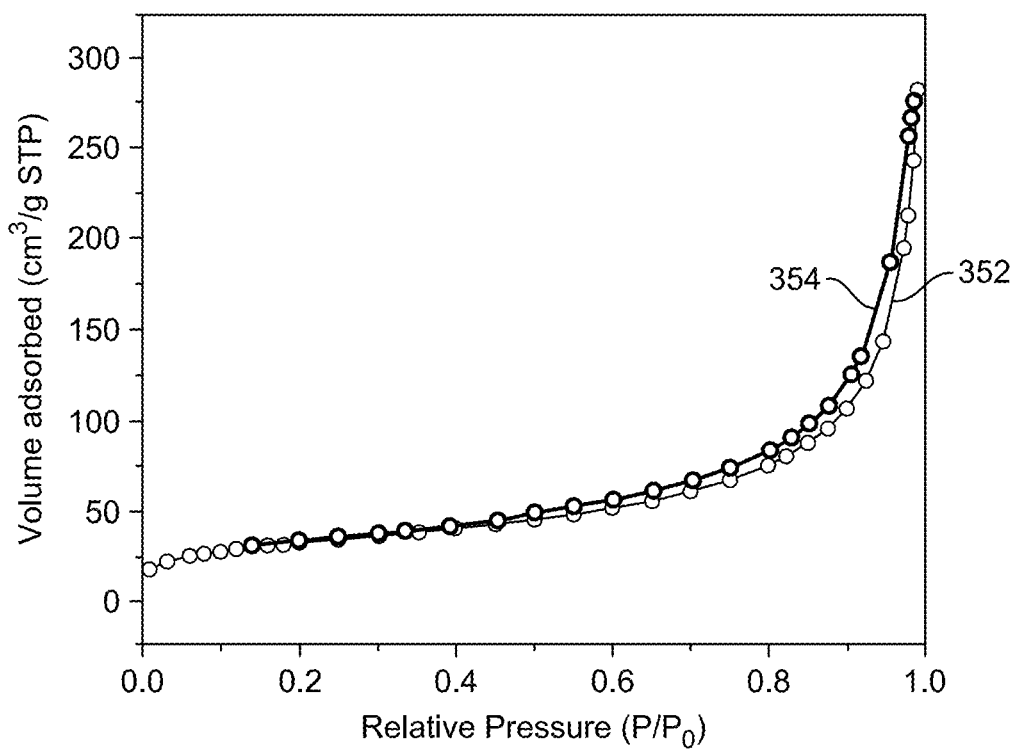
FIG. 3D shows $N_2$ adsorption-desorption isotherms of the sPI, synthesized, according to certain embodiments of the present disclosure.

FIG. 3C shows the EDS spectrum denoting the presence of carbon (C), nitrogen (N), oxygen (O), and sulfur (S) in the sample. The stacked sPI sheets appeared to be composed of a microporous structure. The porosity and surface area of sPI nanosheets were estimated by studying the $N_2$ adsorption (352) and desorption (354) analysis at 77.0 K (FIG. 3D) on a BET surface area analyzer. The BET surface area of the sPI nanosheets was about 112.2 $m^2g^{-1}$. The pore size analysis of the sPI nanosheets demonstrated that sPI nanosheets predominantly are microporous with a pore distribution.

Figure 4A:
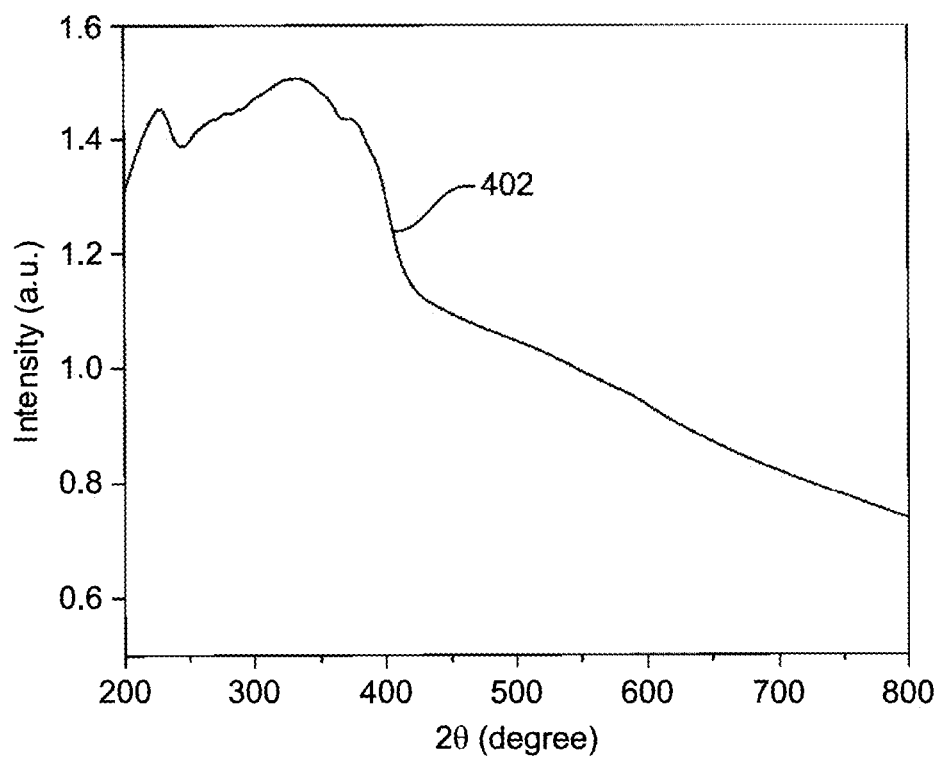
FIG. 4A shows an absorption spectrum of the sPI, according to certain embodiments of the present disclosure.
Figure 4B:
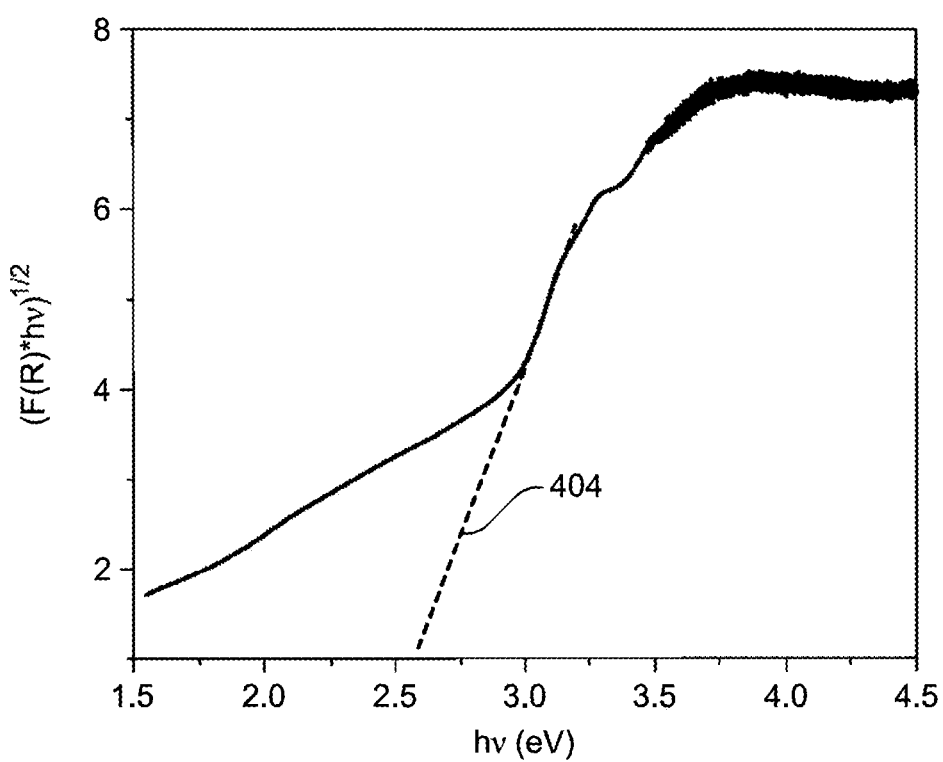
FIG. 4B shows a Tauc plot of the sPI, according to certain embodiments of the present disclosure.
Figure 4C:
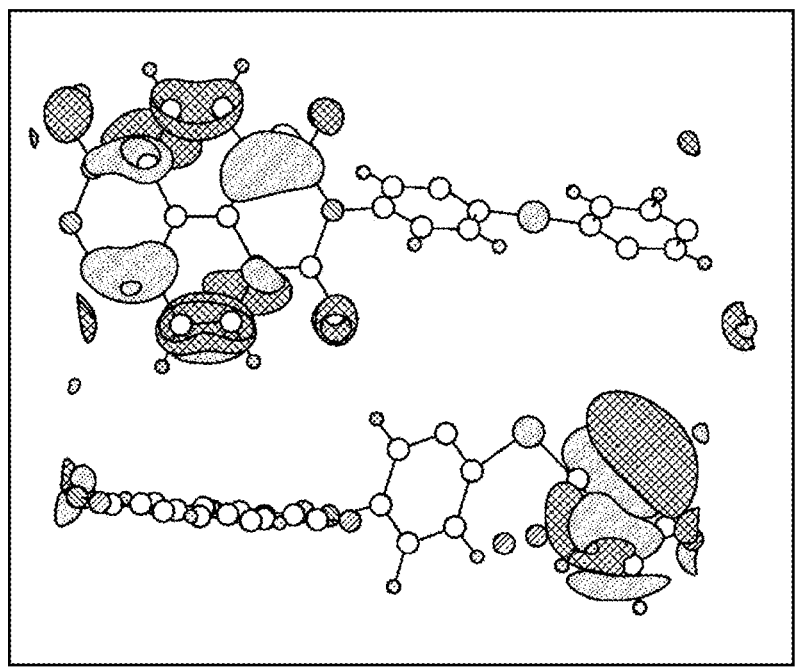
FIG. 4C shows the Kohn-Sham orbital of the sPI, according to certain embodiments of the present disclosure.

The visible light absorption capacity of the sPI was determined by measuring the UV-Vis spectrum. The absorption spectra revealed a strong ability for broad visible light absorption. The absorption onset shifted to the visible-near-infrared (Vis-NIR) region, indicating a higher degree of conjugation in the polyimide chain (402), as observed in FIG. 4A. The presence of a sulfonyl group could also extend the light absorption range of the sPI as the water oxidation potential of a photocatalyst is determined by its band positions. The bandgap of the sPI photocatalyst was calculated employing DRS and was ~2.53 eV (404), as can be observed in FIG. 4B.

Figure 4D:
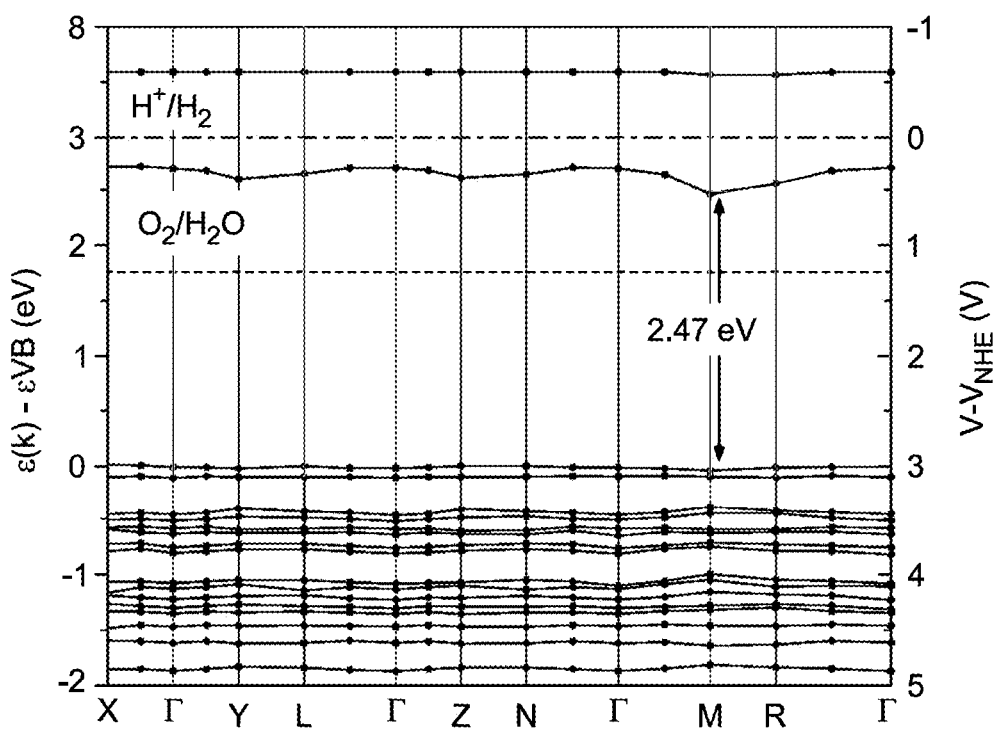
FIG. 4D shows a highest occupied molecular orbital (HOMO) and a lowest unoccupied molecular orbital (LUMO) band position relative to a vacuum of the sPI, according to certain embodiments of the present disclosure.

For an ideal water-splitting photocatalyst, the LUMO should be sufficiently high in energy to drive the photo-reduction reaction, higher than the energy of $H_2/H_2O$ (0 V vs. NHE). In contrast, the HOMO should be sufficiently lower in energy to trigger the photo-oxidation reaction; it should be lower than the energy of $H_2O/0_2$ (−1.23 V vs. NHE). FIG. 4D shows the HOMO and LUMO positions with respect to the energy needed for water splitting. From these data, it can be understood that the polymer is suitable for water oxidation and cannot be applied for hydrogen production.

Further, the PEC performance of the sPI sheets in a 3-electrode assembly was evaluated based on the structural and optical characterizations. Chronoamperometry and EIS spectroscopy techniques were performed, and the results are depicted in FIG. 5. The chronoamperometric (I-t) response of the sPI photoanode (FIG. 5B) was recorded by measuring transient photocurrent response at a constant potential of 0 V vs. SCE (0.59 V vs. RHEW) under intermittent light irradiation, i.e., consecutive light and dark cycles (60 s intervals). The I-t ON/OFF cycles showed an instantaneous generation of photocurrent upon illumination that diminished as soon as the light was switched off. The photoresponse was successfully repeated during the successive cycles, indicating the generation of periodic electrons/hole pairs. Furthermore, the repeated periodicity of photocurrent response over several cycles also indicates the photostable nature of the photoanode under regular light chopping. The stability of conjugated polymers is a crucial factor that needs to be considered while designing photocatalytic material.

Figure 5A:
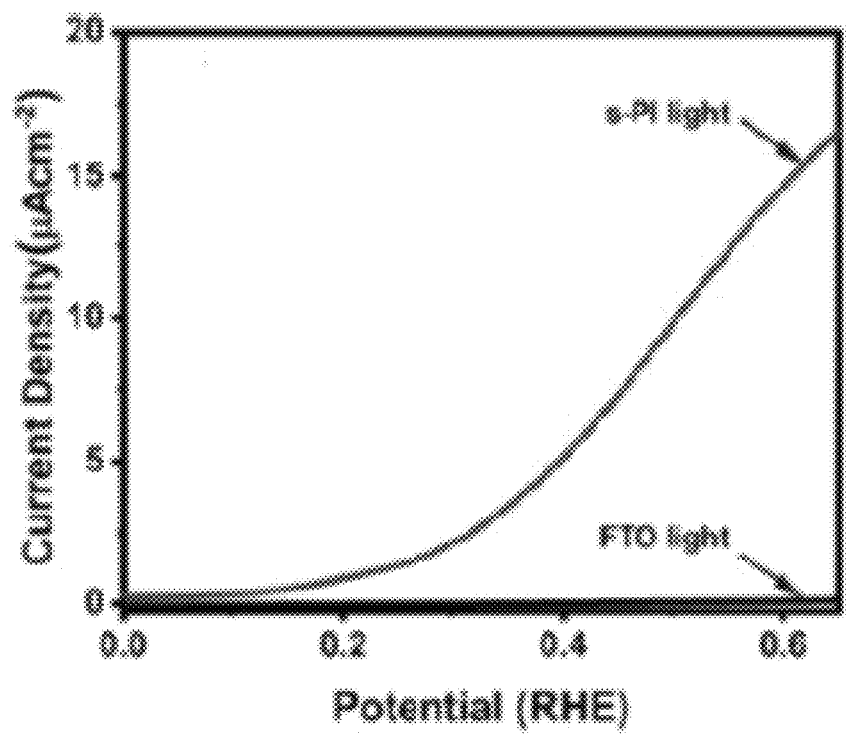
FIG. 5A shows LSV curves of the sPI and bare FTO under irradiation, according to certain embodiments of the present disclosure.
Figure 5B:
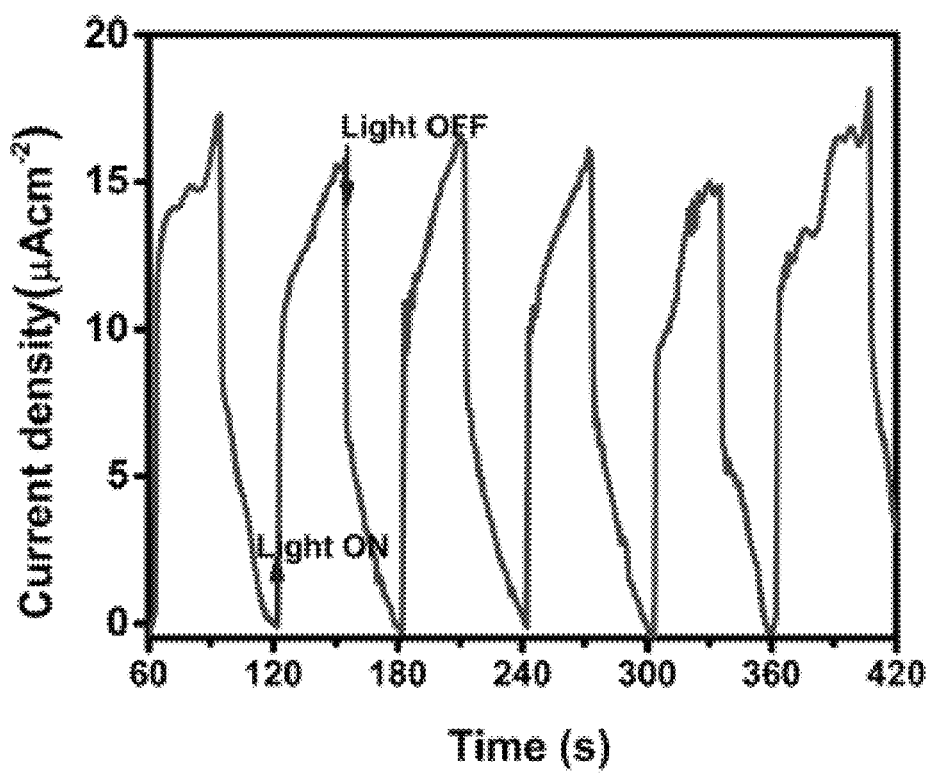
FIG. 5B shows I-t curves under regular chopped light at an applied potential of 0 V vs. SCE with 60 s ON/OFF cycle, according to certain embodiments of the present disclosure.
Figure 5C:
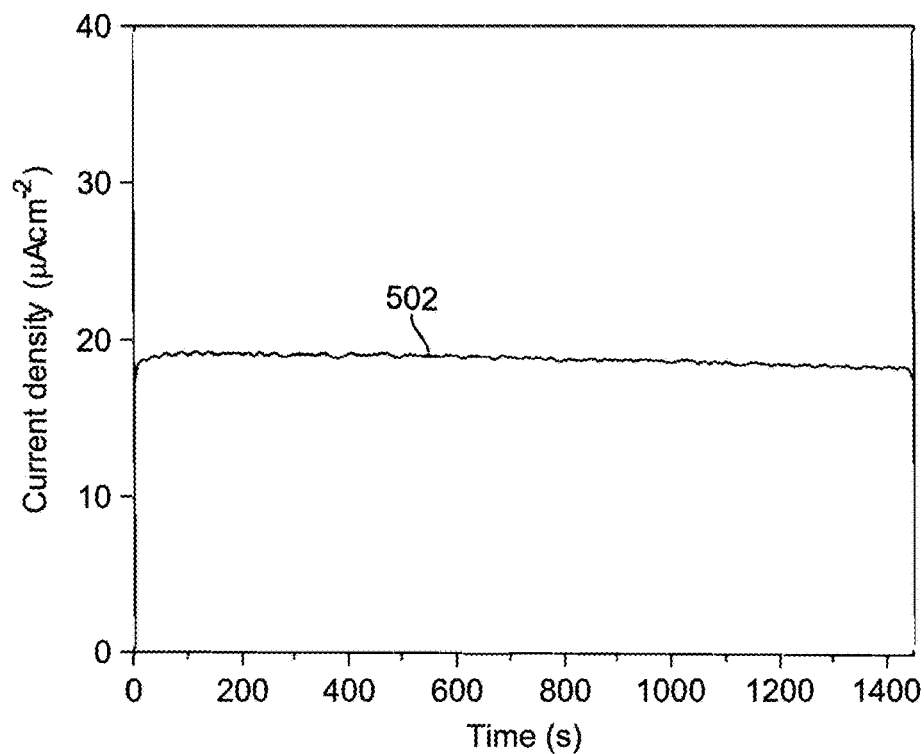
FIG. 5C shows the I-t stability curve under continuous simulated 1-SUN irradiations, according to certain embodiments of the present disclosure.
Figure 5D:
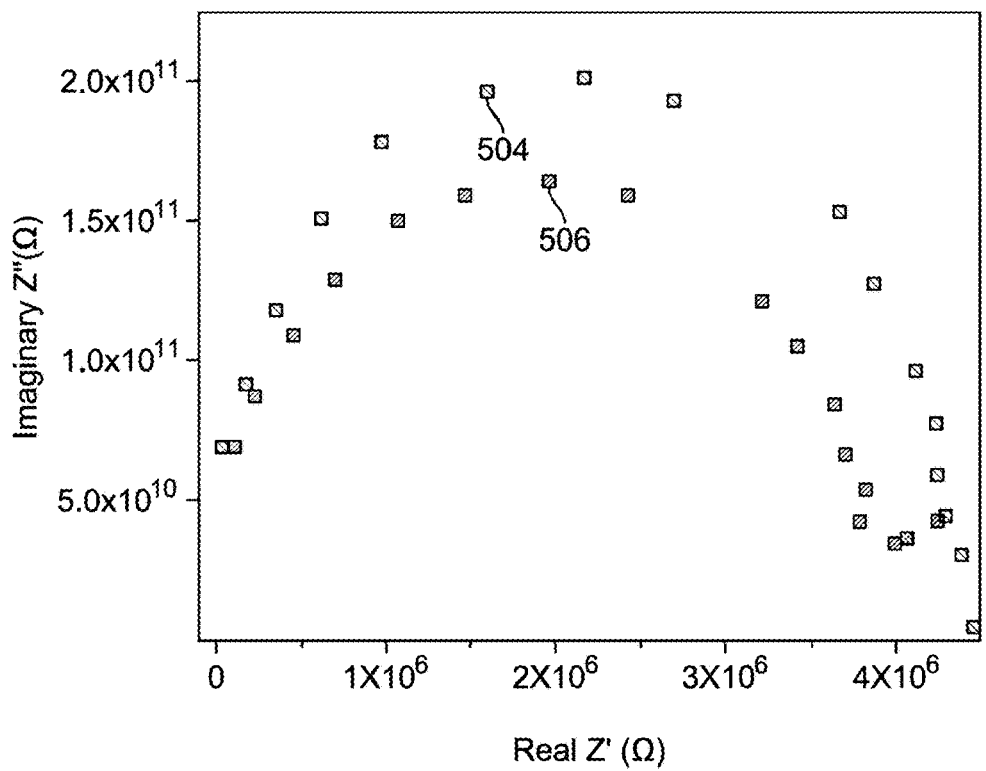
FIG. 5D shows Electrochemical Impedance Spectroscopy (EIS) Nyquist plot spectra under dark and light, according to certain embodiments of the present disclosure.

To further assess the photostability of the sPI photocatalyst, a long-term I-t photostability test was also performed. The photostability of PI photoanode was probed by the I-t response in 0.5 M $Na_2SO_4$ (FIG. 5B). The photocurrent was sustained for an extended period of 1500 s (502), and only a 10-20%, preferably 11-19%, preferably 12-17%, preferably 13-16% drop in the photocurrent density was observed after 20 to 35 minutes. The sPI photoanode exhibited exceptional photostability under photochemical reaction conditions. The interfacial charge transfer resistance from the electrolyte to the surface of the electrode in the sPI was investigated by employing EIS under dark and light conditions. The EIS measurements were carried out in the frequency range from $10^{-2}$-$10^5$ Hz in 0.5 M $Na_2SO_4$ electrolyte at 0.0 V. FIG. 5C shows Nyquist plots under dark and solar simulated radiations. It can be seen in FIG. 5C that under dark, a larger semicircle is obtained (504). While under illumination, a smaller diameter semicircle is observed (506). The smaller radius of Nyquist plot diameter under light is strong evidence of enhancing charge transfer at the photoanode interface qualitatively. This means that the faster charge transfer kinetics with relatively lower resistance occurred under illumination than that under dark. This implies that the photon energy triggered the charge transfer at the interface and hence minimized the charge recombination to a greater extent, a significant bottleneck in water splitting reactions.

The photocurrent density and photostability of the developed sPI photoanode with existing polymer-based water oxidation catalysts were compared. The relative current density and the reaction parameters for different polymer-based photoanodes are provided in Table 1. Three conjugated polymers (CPs) bearing fluorene-dibenzothiophene-S,S-dioxide backbone for photoelectrochemical (PEC) water oxidation under visible-light irradiation (>420 nm) reported recently showed a photocurrent density of 4.1 µA $cm^{-2}$ at +0.6 V (vs. Ag/AgCl). Another flexible polymer for light-assisted seawater oxidation showed a photocurrent 23 µA $cm^{-2}$ at +0.9 V (Ag/AgCl) 0.1 M of $Na_2SO_4$. The observed onset for water oxidation was at 0.68 vs. Ag/AgCl. A conjugated polymer poly-benzimidazobenzophenanthroline demonstrated a photocurrent density of 15 µA.cm$^{-2}$ at +1.23 V (vs. RHE) in buffered sulfate/phosphate electrolyte. A maximum of 0.3 mA photocurrent density was realized at +0.6 V (vs. SCE) in 0.5 M of $Na_2SO_4$.

A solution-processed N-type fullerene-derivative passivated by ZnO layer thin film photoanodes showed a photocurrent density of 30 µA.cm$^{-2}$ at +1.23 V (vs. RHE). The photocurrent densities and photostability values indicate that the sPI photoanode used in this study witnessed a comparable or even higher photocurrent density than the reported values. It was also deduced that PI sustained excellent photocurrent density and higher photostability. The sPI photoanode was bare without further treatment, i.e., surface passivation, doping, or composite formation, and without using any sacrificial agent; however, further treatment and modification of the sPI polyimide catalyst could lead to significant enhancement in photocatalytic efficiency.

TABLE 1

The comparative current density of different polymer-based photoanodes for water oxidation

| Polymer-based Photoanode | Morphology | Photostability retention under 1-SUN | Photocurrent Density |
| --- | --- | --- | --- |
| C5-s Photoanode | Non-homogenous Layered | — | 4.1 µA · cm$^{-2}$ at + 0.6 V (vs./AgCl) 0.5M of $Na_2SO_4$ |
| Flexible poly(terthiophene) | — | 94% after 150 s | 23 µA · cm$^{-2}$ at + 0.9 V (Ag/AgCl) 0.1M of $Na_2SO_4$ |
| poly [benzimidazobenzo-phenanthroline] | Fibrous Distribution | — | 15 µA · cm$^{-2}$ at + 1.23 V (vs. RHE) buffered sulfate/phosphate |
| poly(N-(2-ethylhexyl)-3,6-carbazole-p-bis(2-ethylhexyloxy)-phenylene cyanovinylene) (P1) | Microsphere | ~78% after 275 s | 0.31 µA · cm$^{-2}$ at + 0.6 V (vs. SCE) 0.5M of $Na_2SO_4$ |
| poly(N-(2-ethylhexyl)-3,6-carbazole-p-bisdodecyloxy-phenylene cyanovinylene) (P2) | Agglomerated Microspheres | ~65 % after 275 s | 0.27 µA · cm$^{-2}$ at + 0.6 V (vs. SCE) 0.5M of $Na_2SO_4$ |
| ZnO Passivated [6,6]-phenyl $C_{71}$ butyric acid methyl ester | — | 50 % after ~1000 s | 30 µA · cm$^{-2}$ at + 1.23 V (vs. RHE) harsh alkaline electrolyte |
| Sulfonyl containing polyimide (sPI)* | Highly Layered Structures | 85% after 1400 s | 18 µA · cm$^{-2}$ at 0 V (vs. SCE) 0.5M of $Na_2SO_4$ |

* Photocatalyst of the present disclosure

Mechanism of PEC Water Oxidation on the sPI on Photoanode

The charge transport mechanism in conjugated polyimide is similar to other organic semiconductor photocatalysts. The atomic orbitals overlap to produce molecular orbitals, which results in energy levels upon hybridization, i.e., HOMO/LUMO. The overlap of HOMO and LUMO constructs the energy bands under intermolecular π-π stacking separated by the HOMO-LUMO energy gap. Smaller energy gap values are believed to improve the absorption of visible-light photons. The HOMO/LUMO energy levels strongly depend on the degree of electron delocalization and effective conjugation length (ECL). These interactions give rise to the semiconducting properties and are the critical factors in determining charge transport efficiency.

The splitting of water requires an energy gap of 1.23 V. However, this energy potential condition is not sufficient alone, and the band positions of the frontier molecular orbitals are also crucial to drive the redox reaction. For an ideal water-splitting photocatalyst, the LUMO should be sufficiently high in energy to cause the photo-reduction reaction; it should be higher than the energy of $H_2H_2O$ (−4.5 eV). In contrast, the HOMO should be sufficiently lower in energy to trigger the photo-oxidation reaction; it should be lower than the energy of $H_2O/O_2$ (−5.7 eV).

Absorption of light by the delocalized pi electrons in conjugated polymers promptly generates singlet excitons (coulombically bound electron-hole pairs). The excitons, i.e., electron polarons and hole polarons, are generated if the energy of a photon is greater than the bandgap energy (HOMO-LUMO gap). The excitons need to diffuse at the donor-acceptor interface to convert to charge carriers. The exciton at the interface dissociates into charge carriers due to energy offset in LUMO and HOMO. The wettability of the polymer photocatalyst can be altered by incorporating polar groups into the polymer backbone, such as quaternary ammonium, pyridines, sulfones, and other polar groups. The incorporation of polar groups such as sulfones increases the hydrophilicity of polymeric photocatalysts and improves charge-separation by attracting water molecules (scavengers) onto the surface of the photocatalysts. This is also evident from the observed higher photocurrent density and photostability of the synthesized polyimide photocatalysts of the present disclosure.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A photocatalyst, comprising:
   a sulfone-containing conjugated polyimide obtained by solvothermally imidizing 3,3'-sulfonyldianiline and 1,4,5,8-naphthalenetetracarboxylic dianhydride to form a poly (auric acid) (PAA) and form a polyimide product having the following formula:

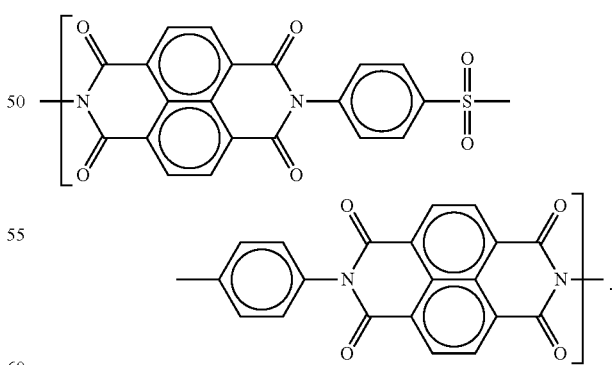

2. The photocatalyst of claim 1, wherein:
   the sulfone-containing conjugated polyimide is in the form of nanosheets having an average length of 100-600 nm and an average thickness of 1-6 nm.

3. The photocatalyst of claim 1, wherein the sulfone-containing conjugated polyimide is semicrystalline.

4. The photocatalyst of claim 2, wherein the nanosheets are in the form of microparticles having an average diameter of 1-2 μm.

5. The photocatalyst of claim 4, wherein within each microparticle the nanosheets are stacked together.

6. The photocatalyst of claim 4, wherein the nanosheets on an exterior surface of each microparticle are curled.

7. The photocatalyst of claim 2, wherein the nanosheets of sulfone- containing conjugated polyimide has a Brunauer Emmett-Teller (BET) surface area of 100-140 $m^2g^{-1}$.

8. The photocatalyst of claim 1, which is substantially free of metal.

9. The photocatalyst of claim 1, wherein the photocatalyst has a band gap of 2.40-2.60 eV.

10. The photocatalyst of claim 1, having at least five X-ray diffraction peaks in a range of 10-30 ° 2θ.

11. The photocatalyst of claim 1, wherein the photocatalyst has thermal stability up to 500° C. from thermogravimetric analysis.

12. A photo-electrochemical cell, comprising:
a photoanode comprising a fluorine-doped tin oxide (FTO) glass substrate coated with a thin film,
wherein the thin film comprises a sulfone-containing conjugated polyimide containing reacted units of 3,3'-sulfonyldianiline and 1,4,5,8-naphthalenetetracarboxylic dianhydride, and a sulfonated tetrafluoroethylene based fluoropolymer-copolymer,
wherein the sulfone-containing conjugated polyimide has the following formula:

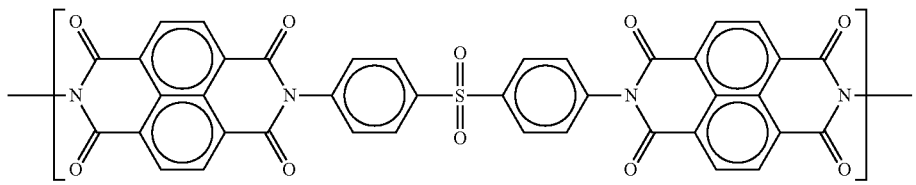

a platinum counter electrode,
a reference electrode, and
an aqueous electrolyte in contact with the photoanode and the counter electrode, wherein the aqueous electrolyte comprises $Na_2SO_4$.

13. The photo-electrochemical cell of claim 12, wherein the photoanode is formed by depositing an aqueous mixture of the photocatalyst, an organic solvent, and a fluoropolymer on a conductive substrate and drying.

14. The photo-electrochemical cell of claim 13, wherein the photoanode does not have surface passivation or doping.

15. The photocatalyst of claim 1, wherein the sulfone-containing conjugated polyimide has five different diffraction peaks in the X-ray diffraction pattern at 2θ ranges selected from the group consisting of 11.05-12.1°, 12.20-14.20°, 14.4-16.20°, 16.22-17.20°, 17.3-19.20°, 21-24.30° and 24.80-25.24°.

* * * * *